(12) United States Patent  
Inomata et al.

(10) Patent No.: US 6,469,570 B1
(45) Date of Patent: Oct. 22, 2002

(54) VOLTAGE SUPPLY CIRCUIT

(75) Inventors: Hiroyasu Inomata, Toyonaka (JP); Satoshi Yatabe, Nagano (JP)

(73) Assignees: Texas Instruments Japan Limited, Tokyo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/856,498
(22) PCT Filed: Oct. 16, 2000
(86) PCT No.: PCT/JP00/07157
§ 371 (c)(1),
(2), (4) Date: Jul. 12, 2001
(87) PCT Pub. No.: WO01/27708
PCT Pub. Date: Apr. 19, 2001

(30) Foreign Application Priority Data

Oct. 15, 1999 (JP) ............................................. 11-294521

(51) Int. Cl.[7] .............................. H02M 3/24; G05F 3/16
(52) U.S. Cl. ........................ 327/536; 327/530; 327/537
(58) Field of Search ................................. 327/530, 537, 327/536, 540, 124; 363/78; 323/313

(56) References Cited

U.S. PATENT DOCUMENTS 5,426,334 A * 6/1995 Skovmand ................... 327/536
6,212,107 B1 * 4/2001 Tsukada ...................... 327/536
6,333,864 B1 * 12/2001 Nishimura et al. ......... 327/537

FOREIGN PATENT DOCUMENTS

JP    U-63-147710    9/1988

* cited by examiner

*Primary Examiner*—Dinh T. Le
(74) *Attorney, Agent, or Firm*—Arent Fox Kintner Plotkin & Kahn, PLLC

(57) ABSTRACT

A voltage supply circuit capable of starting up a system while maintaining symmetry of a high level selection signal $V_H$ and a low level selection signal $V_L$, not requiring a multistage charge pump circuit, and capable of reducing the number of parts of the system, wherein generation circuits of $V_D$ and $V_H$ are comprised of chopper type booster type switching regulators, and switching timings of a $V_H$ generation circuit 12 and a $V_L$ generation circuit 13 are controlled so that a virtual reference voltage $V_S$ ($V_D/2$) and a middle point potential between $V_H$ and $V_L$ become the same.

4 Claims, 8 Drawing Sheets

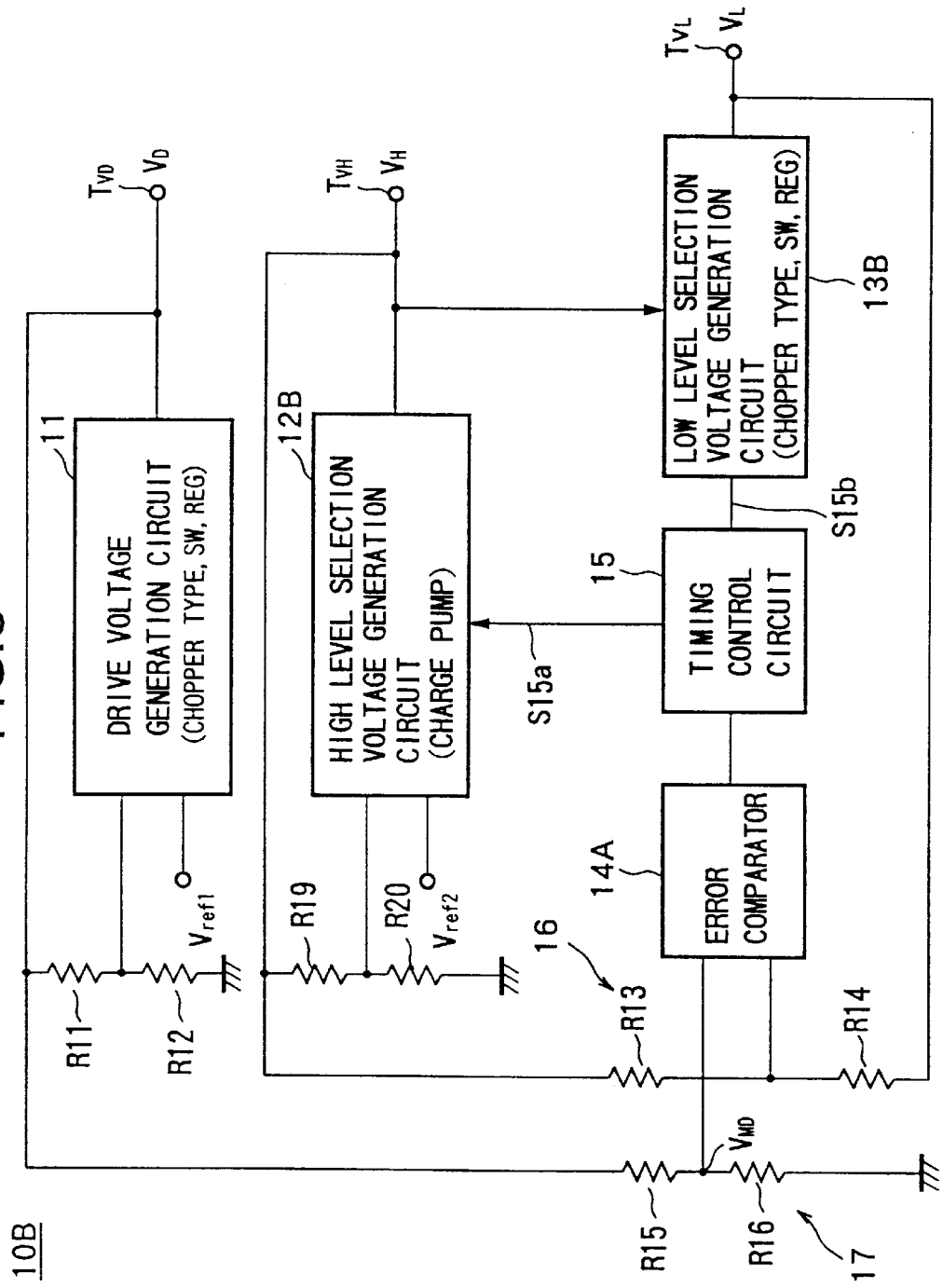

VOLTAGE SUPPLY CIRCUIT

TECHNICAL FIELD

The present invention relates to a voltage supply circuit used as a power supply circuit of for example a liquid crystal display device (LCD panel).

BACKGROUND ART

For example, as a voltage for driving a LCD panel employing the thin film diode (referred to as MIM), three levels, that is, a signal electrode drive voltage $V_D$, a high level selection voltage $V_H$, and a low level selection voltage $V_L$ become necessary.

At this time, the signal electrode drive voltage VD, high level selection voltage $V_H$, and the low level selection voltage $V_L$ must satisfy the following conditions when a virtual selection voltage is $V_{SEL}$:

$$V_L = -V_{SEL}$$
$$V_H = V_D + V_{SEL} \qquad (1)$$

Conventionally, in order to obtain these signal electrode drive voltage $V_D$, high level selection voltage $V_H$, and low level selection voltage $V_L$, a so-called charge pump type voltage generation circuit has been used.

In a voltage supply circuit generating the above three voltages by a voltage generation circuit of the charge pump type, however, there were problems in that equation (1) could not be satisfied with a sufficient precision (particularly when turning on the power) and in that the number of parts of the circuit was too large due to the wide variable range of the virtual selection voltage $V_{SEL}$ (generally about 2 V to 20 V).

DISCLOSURE OF THE INVENTION

The present invention was made in consideration with such a circumstance and has as an object thereof to provide a voltage supply circuit capable of starting up a system while holding symmetry of the high level selection voltage and the low level selection voltage and capable of decreasing the number of parts of the system without the need of a multistage charge pump circuit.

To attain the above object, a voltage supply circuit of the present invention comprises a first voltage generation circuit including a chopper type switching regulator for comparing a first reference voltage and an output feedback voltage and generating a first output voltage, a second voltage generation circuit including a chopper type switching regulator for generating a second output voltage, a third voltage generation circuit including a charge pump for generating a third output voltage in accordance with the second output voltage, a virtual reference voltage generation circuit for generating a virtual reference voltage corresponding to the first output voltage, an intermediate voltage generation circuit for generating an intermediate voltage between the second output voltage and the third output voltage, a comparator for comparing!the virtual reference voltage and the intermediate voltage and outputting an error signal in accordance with the comparison result, and a control circuit for receiving as input the error signal and controlling operations of the second voltage generation circuit and the third voltage generation circuit so that the virtual reference voltage and the intermediate voltage become equal.

Also, in the present invention, the control circuit makes the third voltage generation circuit operate when a voltage difference between the virtual reference voltage and the second output voltage is larger than the voltage difference between the virtual reference voltage and the third output voltage and makes the second voltage generation circuit operate when the voltage difference between the virtual reference voltage and the second output voltage is smaller than the voltage difference between the virtual reference voltage and the third output voltage.

Also, in the present invention, the virtual reference voltage is a middle point potential between the first output voltage and a ground potential, and the intermediate potential is the middle point potential between the second output voltage and the third output voltage.

Further, in the present invention, the second output voltage is higher than the third output voltage.

BRIEF DESCRIPTION OF THE DRAWINGS

FIG. 8 is a view of the configuration of a third embodiment of the voltage supply circuit according to the present invention.

BEST MODE FOR CARRYING OUT THE INVENTION

Preferred embodiments of the present invention will be explained below by referring to the attached drawings.

First Embodiment

Figure 1:
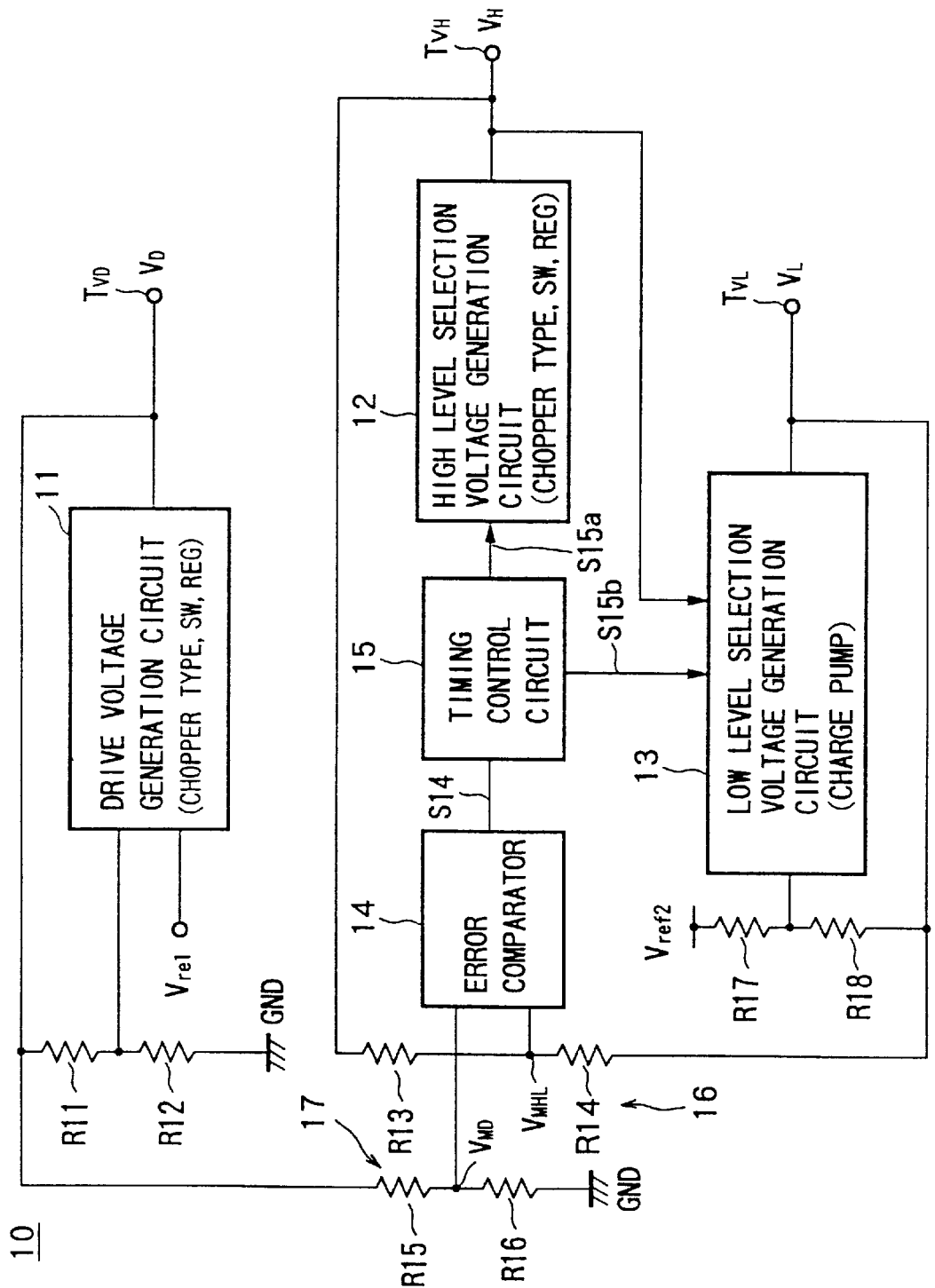
FIG. 1 is a view of the configuration of a first embodiment of a voltage supply circuit according to the present invention.

FIG. 1 is a view of the configuration of a first embodiment of a voltage supply circuit according to the present invention.

A voltage supply circuit 10 of the present invention comprises, as shown in FIG. 1, a drive voltage generation circuit 11, high level selection voltage generation circuit 12, low level selection voltage generation circuit 13, error comparator 14, timing control circuit 15, and resistance elements R11 to R18 as principal components.

Further, a middle point voltage generation circuit 16 for generating a middle point voltage ($V_{MHL}$) between the high level selection voltage $V_H$ as the second voltage and the low level selection voltage $V_L$ as the third voltage is comprised by the resistance elements R13 and R14, while a virtual reference voltage generation circuit 17 for generating a virtual reference voltage $V_{MD}$ as an intermediate potential between the signal electrode drive voltage $V_D$, and the ground potential (GND) is comprised by the resistance elements R15 and R16.

The drive voltage generation circuit 11 has a chopper type booster type switching regulator as its principal component, compares voltages obtained by dividing the signal electrode drive voltage $V_D$ of the output first voltage by the resistance elements R11 and R12 with a first reference voltage $V_{ref1}$, controls the divided voltages to become equal to the first reference voltage $V_{ref1}$, and supplies the output-drive voltage $V_D$ from an output terminal $T_{VD}$ to a not illustrated load side.

Namely, the output drive voltage $V_D$ becomes as follows:

$$V_D = (1 + RV11/RV12) V_{ref1} \quad (2)$$

Here, RV11 indicates a resistance value of the resistance element R11, while RV12 indicates the resistance value of the resistance:element R12.

Figure 2:
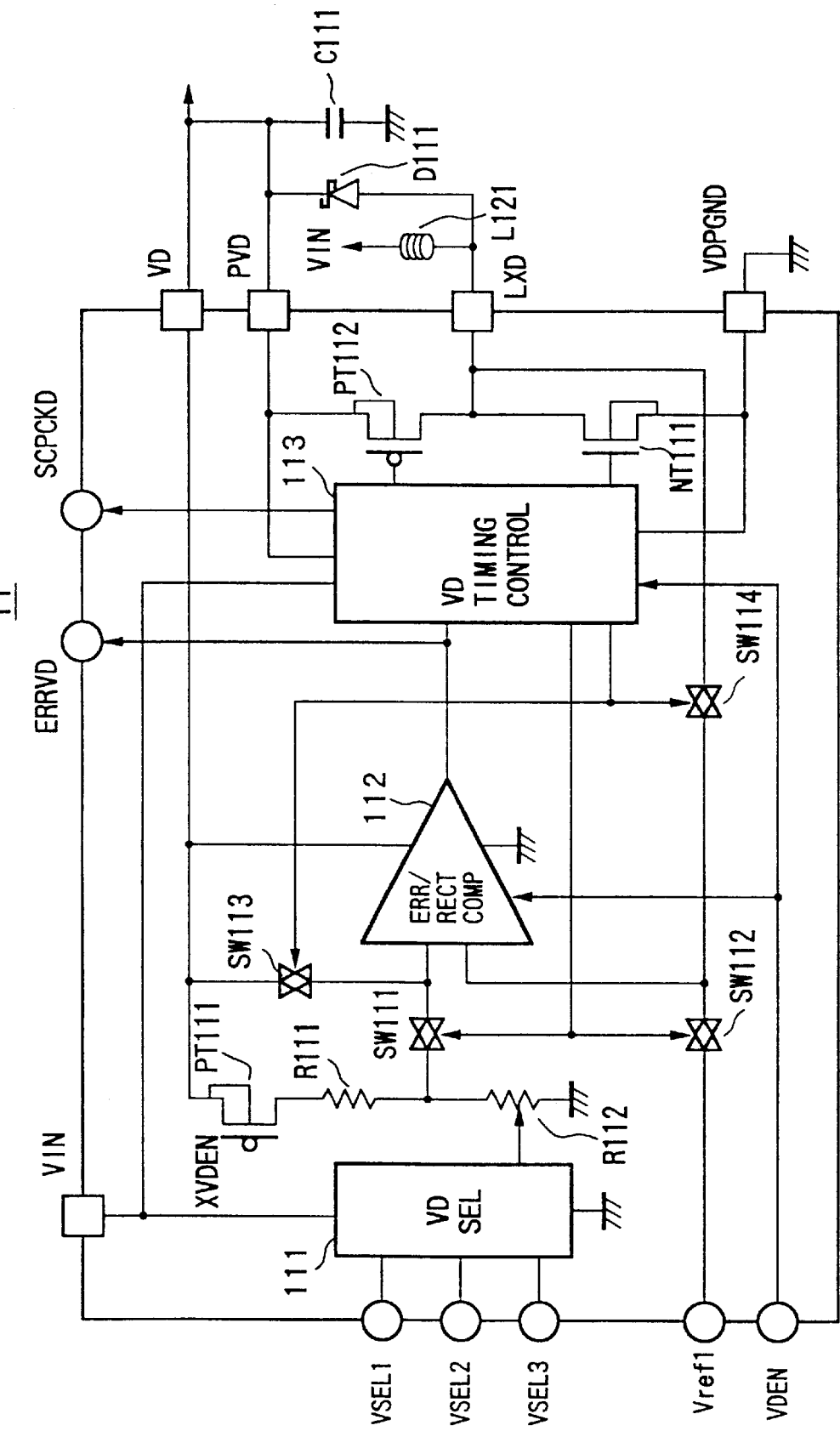
FIG. 2 is a circuit diagram of a concrete example of the configuration of a signal electrode drive voltage generation circuit according to the present invention.

FIG. 2 is a circuit diagram of a concrete example of the configuration of the drive voltage generation circuit 11 according to the present invention.

This drive voltage generation circuit 11 has, as shown in FIG. 2, a drive voltage selection circuit ($V_D$SEL) 111 built in an IC, analog switches SW111 to SW114, drive voltage feedback use resistance elements R111 and R112, a p-channel MOS (PMOS) transistor PT111, error/rectification timing comparator 112, timing control circuit 113, switching use n-channel MOS (NMOS) transistor NT111, synchronized rectification use PMOS transistor PT112, externally attached inductor L111, rectification use Schottky diode D111 and smoothing capacitor C111 as principal components. Note that, in the drive voltage generation circuit 11 shown in FIG. 2, the resistance elements R11 and R12 shown in FIG. 1 are fetched into an internal portion thereof to obtain the resistance elements R11 and R112.

When an enable signal VDEN is at an active high level, an inverted signal XVDEN of the enable signal VDEN supplied to the gate of the PMOS transistor PT111 is at the low level, so the PMOS transistor PT111 is held in a conductive state and a feedback system is established.

Also, while the drive voltage generation circuit 11 is stopped, the switching use transistor is held in a stopped state. Also, all circuits including the feedback system are stopped in order to minimize the consumed current.

Note that, the drive voltage selection circuit 111 selects a suitable drive voltage feedback resistance value from the states of the drive voltage selection signals VSEL 1 to VSEL 3, sets the resistance element R112 at an intended value, and controls the drive voltage $V_D$.

In the drive voltage generation circuit 11 having such a configuration, first the error/rectification timing comparator 112 acts as an error comparator and monitors the drive voltage $V_D$. At this time, the analog switches SW111 and SW112 are held in the conductive state, and the analog switches SW113 and SW114 are held in the nonconductive state by the timing control circuit 113.

In this state, when the voltages obtained by dividing the output drive voltage $V_D$ by the resistance elements R111 and R112 become lower than the first reference voltage $V_{ref1}$, the error signal is output from the error comparator 112 to the timing control circuit 113. The timing control circuit 113 receiving the error signal turns on the output NMOS transistor NT111 for a constant time.

During this time, the error/rectification timing comparator 112 is switched from a function as an error comparator to a function as a rectification timing comparator. At this time, the analog switches SW111 and SW112 are held in the nonconductive state and the analog switches SW113 and SW114 are held in the conductive state by the timing control circuit 113.

While the NMOS transistor NT11 is ON, the energy stored in the externally attached inductor L111 is supplied to the load side through the rectification use PMOS transistor PT112 and the diode D111 simultaneously with the NMOS transistor NT111 turning off.

The ON/OFF timing of this rectification use PMOS transistor PT112 is controlled by the error/rectification timing comparator 112 and the timing control circuit 113.

When this cycle is completed, the error/rectification timing comparator 112 is switched from a function as a rectification timing comparator to a function as an error comparator.

The high level selection voltage generation circuit 12 has a chopper type booster type switching regulator as a principal component, generates the high level selection voltage $V_H$, as the second voltage based on a timing control signal S15$a$ from the timing control circuit 15, supplies the same from an output terminal $T_{VH}$ to the not illustrated load side, and supplies the same to the low level selection voltage generation. circuit 113.

Concretely, the high level selection voltage generation circuit 12 is controlled by the timing control signal S15$a$ so that the following relationship is held:

$$|V_H - V_D/2| = |V_D/2 - V_L| \quad (3)$$

The low level selection voltage generation circuit 13 has a charge pump circuit as a principal component, generates the inverted voltage of the high level selection voltage $V_H$ based on the high level selection voltage $V_H$ supplied from the high level selection voltage generation circuit 12, the voltages obtained by dividing a second reference voltage $V_{ref2}$ by the resistance elements R17 and R18 and a timing control signal S15$b$ by the timing control circuit 15, and supplies this inverted voltage as the low level selection voltage $V_L$ from an output terminal $T_{VL}$ to the not illustrated load side.

The error comparator 14 compares the virtual reference voltage $V_{MD}$ generated at the virtual reference voltage generation circuit 17 and the middle point voltage $V_{MHL}$ generated at the middle point voltage generation circuit 16 and outputs the result of the comparison as an error signal S14 to the timing control circuit 15.

The timing control circuit 15 outputs the timing control signal S15$a$ to the high level selection voltage generation circuit 12 and outputs the timing control signal S15$b$ to the low level selection voltage generation circuit 13 in order to control the switching timings of the high level selection voltage generation circuit 12 and the low level selection voltage generation circuit 13 based on the error signal S14 by the error comparator 14.

Concretely, the timing control circuit 15 controls the switching timings of the high level selection voltage generation circuit 12 and the low level selection voltage circuit 13 so that the following equation is always satisfied so that $V_D/2$ and $(V_H + V_L)/2$ become identical:

$$V_L = -V_{SEL}, V_H = V_D + V_{SEL} \rightarrow V_H + V_L = V_D \rightarrow (V_H + V_L)/2 = V_D/2 \quad (4)$$

Namely, the timing control circuit 15 performs control so that the low level selection voltage circuit 13 performs a switching operation when V. is too high, that is, when $V_{MHL}((V_H + V_L)/2) > V_{MD}(V_D/2)$, while the high level selection voltage generation circuit 12 performs a switching operation when $V_L$ is too low,; that is, when $V_{MHL}<V_{MD}$.

Note that, in the first embodiment of the present invention, the principal portion of the high level selection voltage generation circuit 12 is built in the same block as that for the error comparator 14, timing control circuit 15, middle point voltage generation circuit 16, and virtual reference voltage generation circuit 17.

Figure 3:
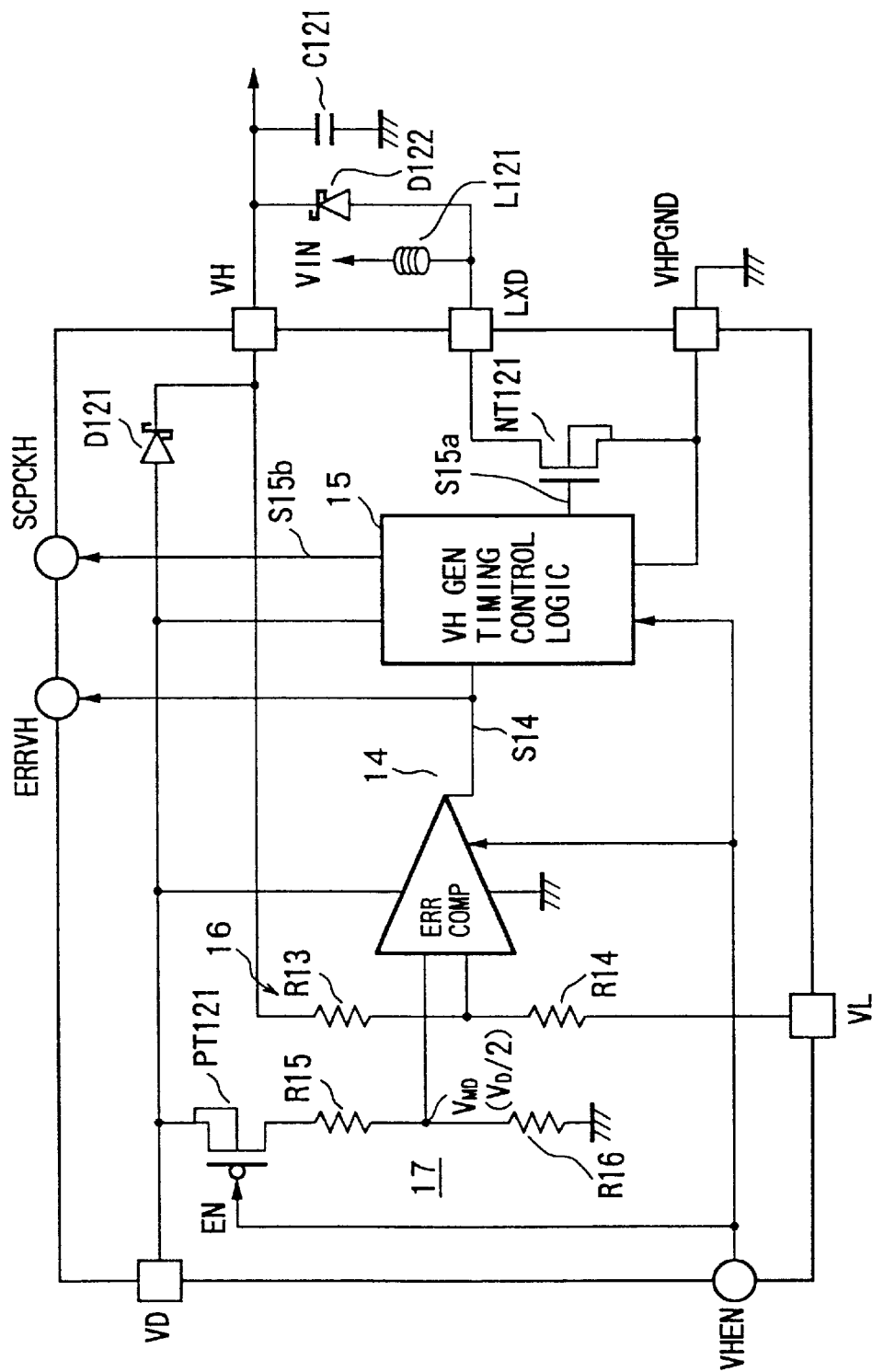
FIG. 3 is a circuit diagram of a concrete example of the configuration of a high level selection voltage generation circuit according to the present invention.

FIG. 3 is a circuit diagram of a concrete example of the configuration of the high level selection voltage generation circuit 12.

The high level selection voltage generation circuit 12 has a switching use NMOS transistor NT121 built in the IC and an externally attached inductor L121, a rectification use Schottky diode D122, and a smoothing capacitor C121 as the principal components as shown in FIG. 3. Also, in this circuit, a PMOS transistor PT121, wherein a gate is connected to an input line of the active enable signal VHEN where the active level is at a low level, is connected between a supply line of the drive voltage $V_D$ to the virtual reference voltage generation circuit 17 and the resistance element R15 of the circuit 17.

In this high level selection voltage generation circuit 12, the operation of the circuit is controlled by the enable signal VHEN based on the entire enable signals etc.

Also, while the drive voltage generation circuit 11 is stopped, the output NMOS transistor NT121 is held in the stopped (nonconductive) state.: Also, in order to minimize the consumed current, all circuits except the feedback resistors (R13, R14) are stopped.

The high level selection voltage generation circuit 12 having such a configuration operates so that the output voltage $V_H$ becomes symmetric with the low level selection voltage $V_L$ with $V_D/2(V_{MD})$ as the virtual reference voltage.

When the voltage obtained by dividing the output voltage $V_H$ by the resistance elements R13 and R14 becomes lower than the virtual reference voltage $V_{MD}$, the error signal S14 is output from the error comparator 14 to the timing control circuit 15. The timing control circuit 15 receiving the error signal S14 turns on the output NMOS transistor NT121 for a constant time.

While the NMOS transistor NT121 is ON, the energy stored in the externally attached inductor L121 is supplied through the rectification use diode D122 to the load side simultaneously with the turning off of the NMOS transistor NT121.

Also, in the high level selection voltage generation circuit 12, the switching is automatically controlled so that the symmetry between the low level selection voltage $V_L$ and the high level selection voltage $V_H$ with respect to $V_D/2$ ($V_{MD}$) is held when the power is turned on.

Figure 4:
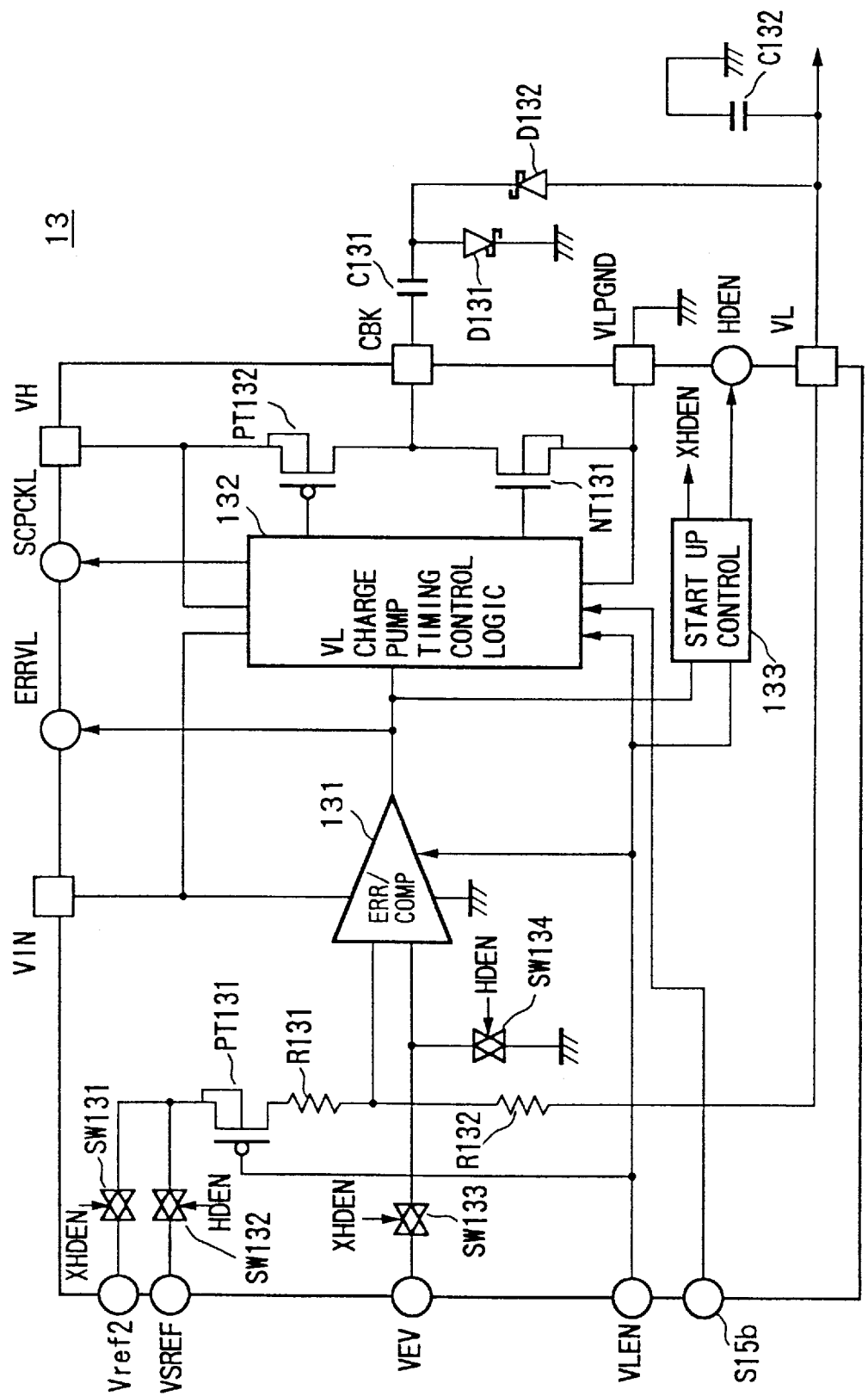
FIG. 4 is a circuit diagram of a concrete example of the configuration of a low level selection voltage generation circuit according to the present invention.

FIG. 4 is a circuit diagram of a concrete example of the configuration of the low level selection voltage generation circuit.

This low level selection voltage generation circuit 13 has, as shown in FIG. 4, low level selection voltage feedback use resistance elements R131 (R17) and R132 (R18), PMOS transistor PT131, analog switches SW131 to SW134, error comparator 131, timing control circuit 132, switching use NMOS transistor NT131 and PMOS transistor PT132, start-up control circuit 133 and an externally attached capacitor C131, clamp use/rectification use Schottky diodes D131 and D132, and a smoothing capacitor C132 built in the IC as the principal components.

In this low level selection voltage generation circuit 13, usually the charge use PMOS transistor PT132 is turned on, and the externally attached capacitor C131 is charged to the $V_H$ potential.

When the low level selection voltage $V_L$ becomes higher than the set value, an error signal is output from the error comparator 131 to the timing control circuit 132. The timing control circuit 132 receiving the error signal turns off the PMOS transistor PT132, turns on the punchdown use NMOS transistor NT131 for a constant time, punches down the minus side of the bucket capacitor C131, and supplies a charge to a terminal VL side through the rectification use diode D132.

As the reference voltage for generating the low level selection voltage $V_L$, use is made of a second reference voltage $V_{ref2}$ (for example 2 V) and a voltage VEV set for the start-up.

When the low level selection voltage $V_L$ reaches for example −1.6 V, the start-up control circuit 133 receiving the error signal from the error comparator 131 switches the reference voltage to VSREF and GND. At this time, the analog switches SW132 and SW134 are held in the conductive state, while the analog switches SW131 and SW133 are held in the nonconductive state.

Also, the start-up control circuit according to the present embodiment simultaneously outputs operation start signals to the drive voltage generation circuit 11 and the high level selection voltage generation circuit 12.

Next, an explanation will be made of the operation by the above configuration with relation to the timing charts of FIG. 5 and FIG. 6.

Figure 5:
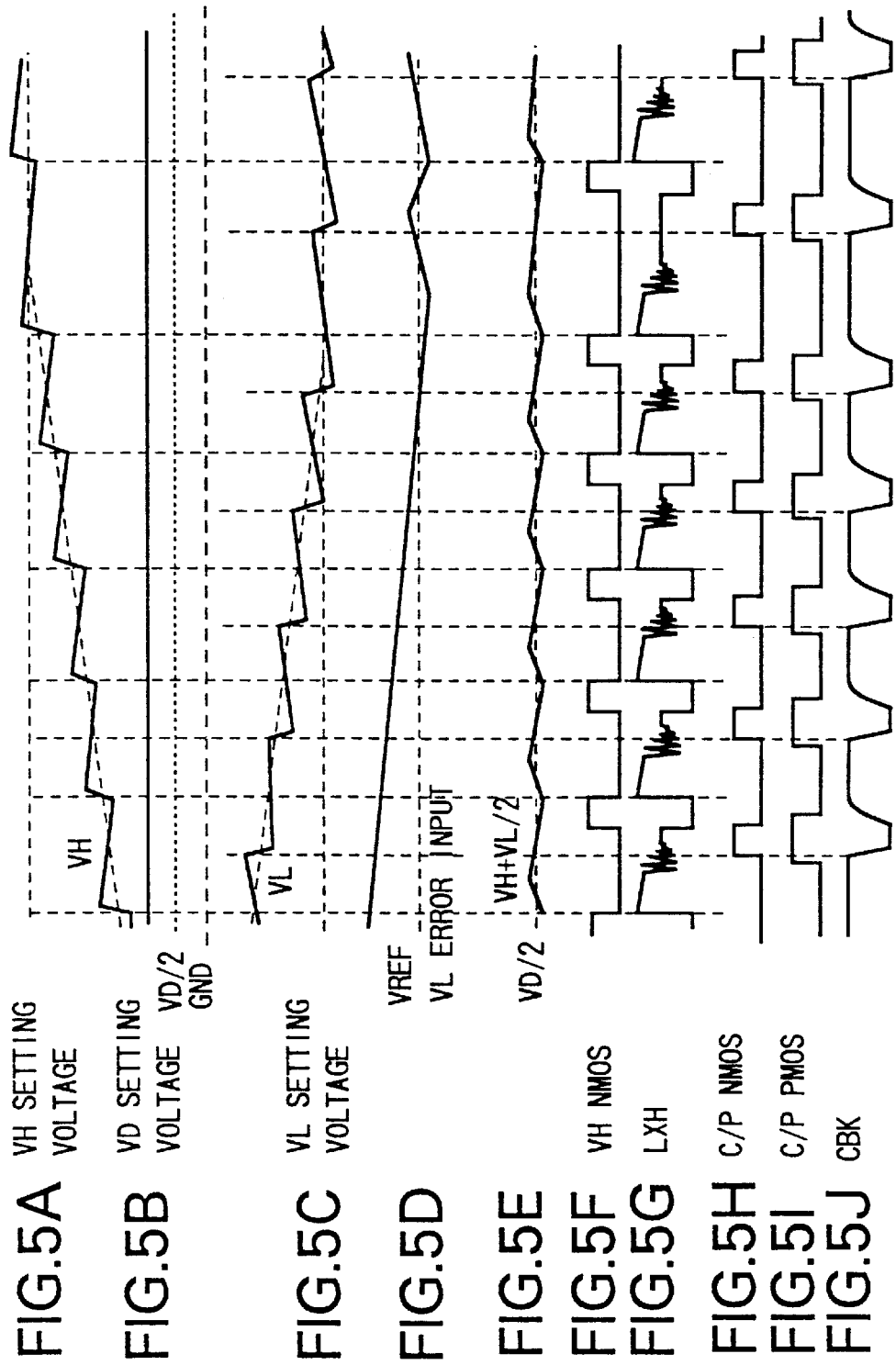
FIG. 5 is a flowchart for explaining an operation at the time of startup of the voltage supply circuit according to the present invention.
Figure 6:
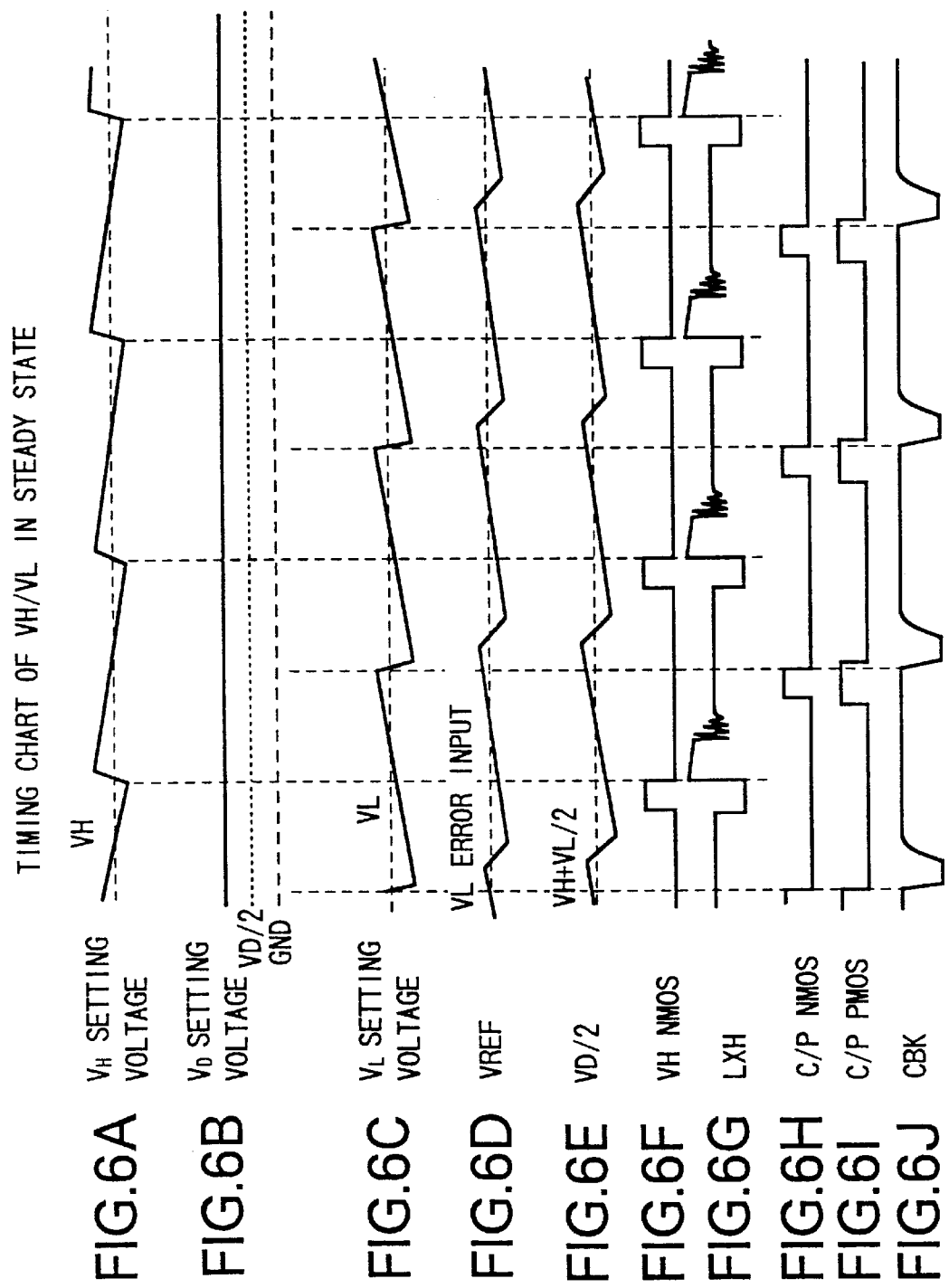
FIG. 6 is a flowchart for explaining an operation in a normal mode of the voltage supply circuit according to the present invention.

FIG. 5 is a timing chart at the time of startup, while FIG. 6 is a timing chart at the time of steady operation.

In the low level selection voltage generation circuit 13, after the start of the operation, when the low level selection voltage $V_L$ reaches a predetermined voltage (−1.6 V in the present embodiment), the error signal from the error comparator 131 is output to the start-up control circuit 133.

At the start-up control circuit 133 receiving the error signal, the reference voltage is switched to VSREF and GND, and the original low level selection voltage $V_L$ is generated. Also, at this time, the operation start signals are simultaneously output-from the start-up control circuit 133 to the drive voltage generation circuit 11 and the high level selection voltage generation circuit 12. Due to this, the drive voltage generation circuit 11 and the high level selection voltage generation circuit 12 enter the operation state.

Then, thereafter, the high level selection voltage $V_H$ and the low level selection voltage $V_L$ start up so as to become symmetrical about $V_D/2$.

In the drive voltage generation circuit 11, the divided voltages obtained by dividing the output voltage $V_D$ by the resistance elements R111 and R112 are compared with the first reference voltage $V_{ref1}$, and the chopper type booster type switching regulator is controlled so that the divided voltages become equal to the first reference voltage $V_{ref1}$.

The drive voltage $V_D$ controlled in this way is supplied to a not illustrated for example drive system of LCD panel and supplied to the virtual reference voltage generation circuit 17.

In the virtual reference voltage generation circuit 17, the drive voltage $V_D$ is divided by the resistance elements R15 and R16 and output as the virtual reference voltage $V_{MD}$ of $V_D/2$ to the error comparator 14.

In the error comparator 14, magnitudes of the supplied virtual reference voltage $V_{MD}$ (=$V_D/2$) and the middle point voltage $V_{MHL}$ between the high level selection voltage $V_H$ and the low level selection voltage $V_L$ generated at the middle point voltage generation circuit 16 are compared. The result thereof is output as the error signal S14 to the timing control circuit 15.

In the timing control circuit 15, the timing control signals S15a and S15b are output to the high level selection voltage generation circuit 12 and the low level selection voltage generation circuit 13 in order to control the timings of switching of the high level selection voltage generation circuit 12 and the low level selection voltage generation circuit 13 based on the error signal S14.

More concretely, the timing control circuit 15 controls the timings of switching of the high level selection voltage generation circuit 12 and the low level selection voltage generation circuit 13 so that $V_D/2$ and $(V_H+V_L)/2$ $(=V_{MHL})$ become identical.

Then, at the time of startup, the low level selection voltage generation circuit 13 tries to continue the switching until the value of '$V_L$ Error Input' (output voltage value) matches the reference voltage $V_{REF}$ as shown in FIG. 5(D), but when $(V_H+V_L)/2$ $(=V_{MHL})$ is lower than $V_D/2$, it is controlled so as to stop until $(V_H+V_L)/2$ $(=V_{MHL})$ becomes $V_D/2$ or more.

Also, at the time of startup, the high level selection voltage generation circuit 12 is controlled so as to perform the switching when $(V_H+V_L)/2$ is lower than $V_D/2$.

Then, even in the steady state, the low level selection voltage generation circuit 13 is controlled by the timing control circuit 15 so that the value of '$V_L$ Error Input' of feedback matches with the value of $V_{REF}$ (=GND) as shown in FIG. 6(D) and performs the switching when $V_{REF}$ (=GND)<$V_L$ Error Input.

Also the on time of the punchdown use NMOS transistor NT131 at this time is controlled by the internal time constant circuit. Also, when the NMOS transistor NT131 is off, the PMOS transistor PT132 is always held in the on state. Due to this, the capacitor C131 is charged.

The low level selection voltage $V_L$ generated in this way is output to the not illustrated drive system of the LCD panel.

Also, the high level selection voltage generation circuit 12 is controlled by the timing control circuit 15 so as to perform the switching when $(V_H+V_L)/2$ is lower than $V_D/2$ in the same way as the time of startup.

The NMOS transistor NT121 comprising the chopper type booster type switching regulator at this time is held in the on state for exactly a constant time controlled by the internal time constant circuit. Further, the off time is similarly controlled so as to reliably perform the rectification.

Also, when the NMOS transistor NT131 is off, the PMOS transistor PT132 is always held in the on state. Due to this, the capacitor C131 is charged.

Note, the PMOS transistor PT132 and the NMOS transistor NT131 are controlled in their timings of switching by the timing control circuit 132 so that they do not simultaneously turn on.

The high level selection voltage $V_H$ created in this way is supplied to the not illustrated drive system of the LCD panel.

As explained above, according to the first embodiment of the present invention, the generation circuit of the drive voltage $V_D$ and the high level selection voltage $V_H$ among the three levels required for the LCD panel drive in the DTFD (MIM) system is comprised of the chopper type booster type switching regulator, feedback is applied so that the virtual reference voltage $V_{MD}(:V_D/2)$ obtained by dividing the drive voltage $V_D$ by the resistor and the middle point potential between the high level selection voltage $V_H$ and the low level selection voltage $V_L$ become the same, and the switching timings of the high level selection voltage generation circuit 12 and the low level selection voltage generation circuit 13 are controlled, therefore a multistage charge pump circuit for dealing with a wide range of the virtual voltage $V_S$ is unnecessary, and thus the number of components of the system can be decreased.

Also, the system can be started up while maintaining the symmetry between the high level selection voltage $V_H$ and the low level selection voltage $V_L$. For example, it is possible to prevent deterioration of the characteristics of the liquid crystal due to for example DC bias.

Second Embodiment

Figure 7:
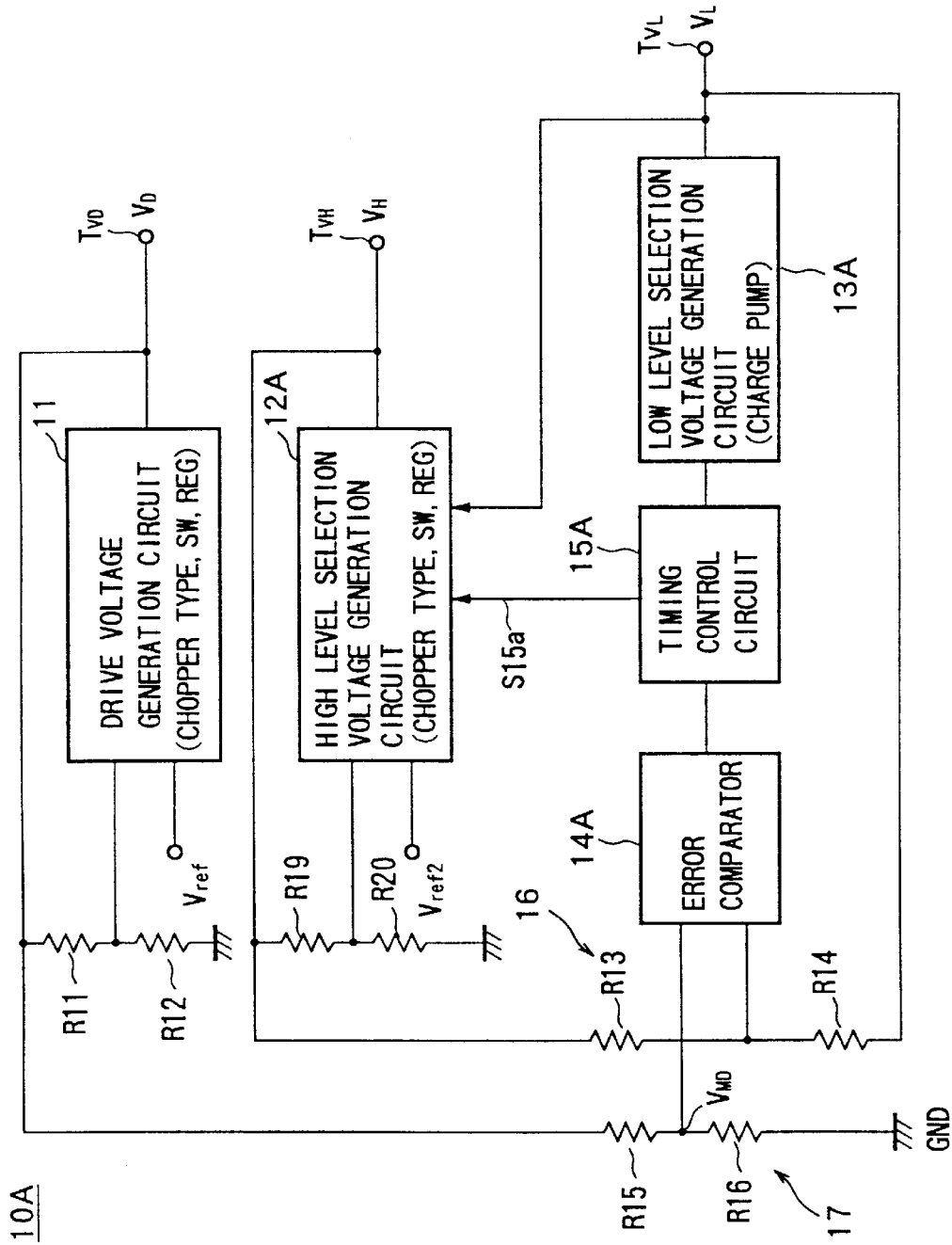
FIG. 7 is a view of the configuration of a second embodiment of the voltage supply circuit according to the present invention.

FIG. 7 is a circuit diagram of a second embodiment of the voltage supply circuit according to the present invention.

The difference of the second embodiment of the present invention from the first embodiment resides in the fact that an error comparator 14A and a timing control circuit 15A are built in the same block as that of the principal components of a low level selection voltage generation circuit 13A in place of a high level selection voltage generation circuit 12A.

Then, in the second embodiment of the present invention, the high level selection voltage generation circuit 12A compares the voltages obtained by dividing the high level selection voltage $V_H$ of the output by the resistance elements R19 and R20 with the second reference voltage $V_{ref2}$, and controls the divided voltages to become equal to the second reference voltage $V_{ref2}$.

The rest of the configuration: is similar to that of the first embodiment mentioned above.

According to the second embodiment of the present invention, a similar effect to that by the first embodiment can be obtained.

Third Embodiment

FIG. 8 is a view of the configuration of a third embodiment of the voltage supply circuit according to the present invention.

The difference of the embodiment of the present invention from the second embodiment resides in the fact that a high level selection voltage generation circuit 12B is comprised of the charge pump circuit and that the low level selection voltage generation circuit 13B is comprised by the chopper type booster type switching regulator (Sw, Reg).

The rest of the configuration is similar to that of the second embodiment.

In the third embodiment of the present invention as will, a similar effect to that by the first embodiment can be obtained.

Also, in the embodiment shown in FIG. 1, it is also possible to make the high level selection voltage generation circuit 12 a charge pump and make the low level selection voltage generation circuit 13 a chopper type regulator. Further, it is also possible to make the drive voltage generation circuit 11 a charge pump.

INDUSTRIAL APPLICABILITY

As explained above, according to the voltage supply circuit of the present invention, there is an advantage in that a multistage charge pump circuit for dealing with the wide range of the virtual selection voltage is unnecessary, so the number of the components of the system can be decreased.

Also, startup and driving of the system while maintaining the symmetry of the high level selection voltage and the low level selection voltage are possible and in turn deterioration of the characteristics of the liquid crystal due to for example DC bias can be prevented.

What is claimed is:

1. A voltage supply circuit comprising:
   a first voltage generation circuit including a chopper type switching regulator for comparing a first reference voltage and an output feedback voltage and generating a first output voltage,
   a second voltage generation circuit including a chopper type switching regulator for generating a second output voltage,
   a third voltage generation circuit including a charge pump for generating a third output voltage in accordance with said second output voltage,
   a virtual reference voltage generation circuit for generating a virtual reference voltage corresponding to said first output voltage,
   an intermediate voltage generation circuit for generating an intermediate voltage between said second output voltage and said third output voltage,
   a comparator for comparing said virtual reference voltage and said intermediate voltage and outputting an error signal in accordance with the comparison result, and
   a control circuit for receiving as input said error signal and controlling operations of said second voltage generation circuit and said third voltage generation circuit so that said virtual reference voltage and said intermediate voltage become equal.

2. A voltage supply circuit as set forth in claim 1, wherein said control circuit makes said third voltage generation circuit operate when a voltage difference between said virtual reference voltage and said second output voltage is larger than the voltage difference between said virtual reference voltage and said third output voltage and makes said second voltage generation circuit operate when the voltage difference between said virtual reference voltage and said second output voltage is smaller than the voltage difference between said virtual reference voltage and said third output voltage.

3. A voltage supply circuit as set forth in claim 1 or 2, wherein said virtual reference voltage is a middle point potential between said first output voltage and a ground potential, and said intermediate potential is the middle point potential between said second output voltage and said third output voltage.

4. A voltage supply circuit as set forth in claim 2, wherein said second output voltage is higher than said third output voltage.

* * * * *